W. H. KELLY.
PROCESS FOR REDUCING ORES AND METALS.
APPLICATION FILED AUG. 17, 1908.
1,024,136. Patented Apr. 23, 1912.
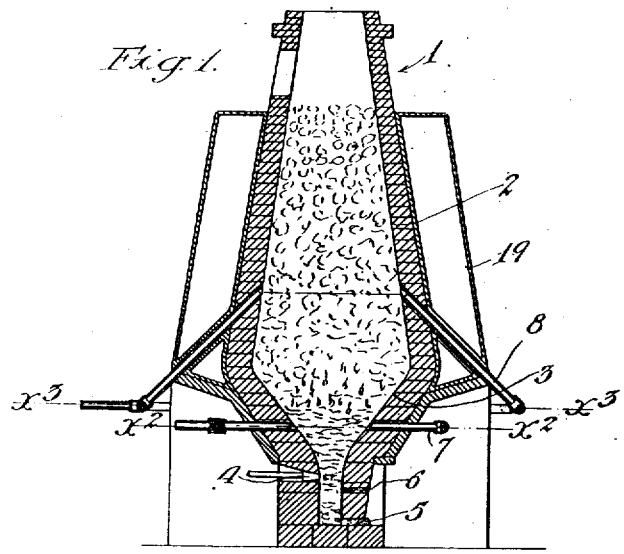
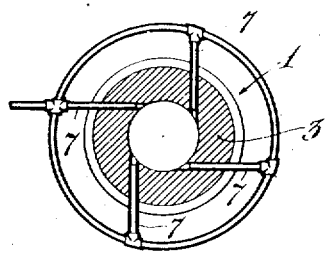
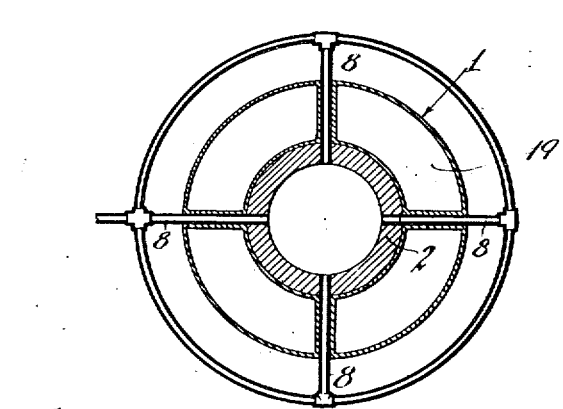
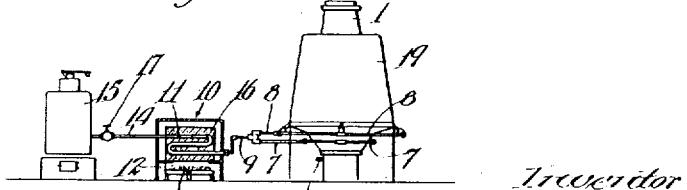

UNITED STATES PATENT OFFICE.

WILLIAM H. KELLY, OF LOS ANGELES, CALIFORNIA.

PROCESS FOR REDUCING ORES AND METALS.

1,024,136.  Specification of Letters Patent.  Patented Apr. 23, 1912.

Application filed August 17, 1908. Serial No. 448,971.

*To all whom it may concern:*

Be it known that I, WILLIAM H. KELLY, a citizen of the United States, residing at Los Angeles, county of Los Angeles, State of California, have invented a new and useful Process for Reducing Ores and Metals, of which the following is a specification.

This invention relates to process and apparatus for reducing ores and metals, and is particularly intended for the reduction of iron and other metals, and the elimination therefrom of sulfur, phosphorus, etc., although it is applicable in other connections.

In my application Serial No. 445,566, filed July 27, 1908, I have disclosed a process for treatment of metals by introducing into the mass of metal superheated steam containing nascent oxygen and hydrogen, the object of the process in that case being to purify the metal after it has been reduced.

The present invention relates to a process and apparatus for treatment of metals in and during the reduction thereof.

The main object of the invention is to provide a process and means whereby sulfur, phosphorus and other deleterious impurities may be eliminated from metal during the smelting thereof.

A further object of my invention is to provide a process and means of melting or reducing ores or metals in a quick and efficacious manner.

A further object of the invention is to provide for the reduction in such manner that both the metal and the slag have a maximum fluidity, thereby providing an effectual separation of the slag from the metal.

The essential features of the process are subjecting the ore or metal during the smelting operation to a gas derived from steam, which has been heated to such a temperature as to partly dissociate it into oxygen and hydrogen, the application of this gas to the ore or metal being made under such conditions that the oxygen and hydrogen are in a nascent state or condition.

The accompanying drawings illustrate the invention.

Figure 1 is a vertical section of the furnace. Fig. 2 is a transverse section on the line $x^2$—$x^2$ Fig. 1. Fig. 3 is a transverse section on the line $x^3$—$x^3$ Fig. 1. Fig. 4 is a side elevation of the furnace and of the system for supplying the dissociated water hereto; the retort or heater for dissociating steam into nascent oxygen and hydrogen being shown partly in section.

The apparatus comprises the smelting chamber 1, which may be a blast furnace of the usual construction, with a shaft 2 and boshes 3. The chamber is open at the top to enable it to be charged with ore, coke, etc., in the usual manner, and is provided at the lower portion thereof with the usual twyers 4 to enable gases or air to be blown into the charge, and with tap hole 5, and a slag hole 6.

Above the level of the twyers are provided pipes 7, 8, preferably arranged in a plurality of series or rows one above the other. For example, row 7 may enter the boshes of the blast furnace chamber at the melting zone, and an upper row 8 may enter the shaft of the blast furnace at the reducing zone. Pipes 7, 8 are connected to a main pipe 9, leading from the retort or heater 10, consisting of a coil or chamber 11 inclosed in a suitable furnace chamber 12, and adapted to be heated by the burner means 13, this chamber or coil 11 being connected by pipe 14 to a steam boiler or generator 15. As it is intended that the steam should be heated in the retort to a temperature above red heat, it is preferred to inclose the coil or chamber 11 in a protecting coating or bed 16 of refractory metal. A valve 17 is provided in the connection 14 from the burner to the retort, to control the supply of steam to the retort.

My invention is not limited to the special manner of application of the pipes 7, 8 to the blast furnace or the special construction of the blast furnace. In order, however, to protect the blast furnace walls as far as possible from being burned out by the corrosive action of the jet of dissociated oxygen and hydrogen issued from said pipes, the pipes 7 at the narrow part of the blast furnace may enter tangentially so as to produce a swirl distributing the gases equally throughout the heat zone and allowing them to mingle with the heat producing elements as well as contacting with the molten metal and slags. Further oxygen and hydrogen is admitted by pipes 8. By directing these pipes obliquely upward into the shaft of blast furnace 1, an upward draft is induced on the gases in the lower portion of the furnace, which causes them to flow upwardly and commingle with the gases admitted by pipes 8. The hydrogen thus added to the hydrogen admitted by pipes 7 furnishes a large excess which combines with the sulfur and other impurities in the heating zone. The pipes 8 pass through jacket 19 of the blast furnace and are insulated so as to retain the heat of the dissociated gases.

The process is carried out as follows:— The smelter having been charged and set in operation in the usual manner, steam is turned on from the boiler and passing through the heater or retort 10 is subjected to such high temperature that it is partly dissociated into oxygen and hydrogen. At the instant of dissociating, the oxygen and hydrogen are in a nascent state, and the dissociator or retort 10 is located so close to the blast furnace and the pipes 9, 7 8 are so protected against loss of heat, that this nascent condition continues and exists in the oxygen and hydrogen when they are discharged from the pipes 7, 8 into the blast furnace chamber. The gas thus directed from the pipes 7, 8 to the blast furnace chamber is possessed of the following properties. It consists of oxygen and hydrogen in the nascent state, and the temperature is so high that it approaches or may even exceed that of the charge at the point where the oxygen and hydrogen is introduced. Immediately upon entering the charge the nascent oxygen and hydrogen combine with the contents of the charge for which it has the greatest affinity, the oxygen combining partly with the carbon to form carbon monoxid the reactions of which with the iron ore and carbon follow the usual course; another part of the oxygen combines directly with the iron, but is released therefrom in the subsequent operations in the usual manner; a further part of the oxygen combines with the silicon, which in connection with iron and the other substances present, forms slag.

The hydrogen of the dissociated steam at the high temperature stated combines with the sulfur, phosphorus, arsenic, etc., mixed with or combined with the metals and removes them from the metals, and the products of combination of hydrogen with these substances being gaseous, such products will pass upwardly and be discharged at the top of the blast furnace. In so far as these products may be consumed within the blast furnace they will combine with the slag in preference to the metal.

The above described reactions produce heat, which is added to that already existing in the charge, and in the nascent oxygen and hydrogen supply, so that the temperature of the charge is considerably above that usually attained even with the hot blast. The supply of oxygen and hydrogen at the upper row of pipes serves to produce a cleaner and more rapid smelting or reduction as stated, and the supply of nascent oxygen and hydrogen at the lower row of pipes serves to increase the fluidity of the smelted metal and slag as it is dropping through the coke, etc., so that as the metal settles in the bottom of the blast furnace the slag separates freely and the metal and slag are not only more effectually separated, but can be more readily tapped off, and the formation of sows on the walls of the blast furnace is prevented. It will be understood that the solid portions of the charge arches over the boshes in the usual manner and that the melting zone and metal as it melts and collects in drops is immediately subjected to the action of the nascent gases from the pipe 7. This action continues as the metal passes through the open structure of the melting zone. The swirling action due to the tangential arrangement of pipes 7 causes the metal in this condition to be subjected uniformly to the action of the nascent gases.

In the reaction of the hydrogen with the sulfur, phosphorus, etc., in the reducing zone, these substances pass off in a reduced form, and the process is preferably so carried out, that they are discharged from the blast-furnace in that form, thereby obviating the objectionable results of discharging corrosive gases such as sulfur dioxid into the atmosphere.

An important advantage of the process is that it not only purifies the iron and frees it from slag, but it purifies the slag freeing it from iron and other impurities, except in so far as the sulfur and phosphorus may be carried into the slag by secondary reactions. The main advantages of the process, however, relate to the purity of the produced metal, especially as regards freedom from sulfur and phosphorus, and to the economy of the process. In regard to economy the process presents the advantage that the amount of air blast needed can be reduced in proportion to the amount of oxygen furnished by the dissociated steam. The oxygen being the only active agent in the air blast, the supply of oxygen in the dissociated steam not only correspondingly reduces the amount of oxygen needed in the air blast, but supplies the oxygen in a more available and purer form. Furthermore, in the air blast the oxygen is diluted with four times its volume of inert nitrogen, whereas in the dissociated steam the two mixed gases are both available in the process, as above described. The economy of the process is especially apparent where a hot blast is used as it avoids the heating of the equivalent quantity of air blast, and in view of the large proportion (about 80 per cent. by volume) of inert or useless nitrogen in the air blast, this saving in heating is large. The comparative freedom from nitrogen is of advantage, not only in reducing the amount of material to be heated and to be blown through the furnace, but it is of direct chemical advantage with some ores, owing to the injurious effect of nitrogen with such ores, by the formation of cyanogen. To make one ton of iron by the use of the ordinary air blast requires from one-half million to one million cubic feet of air in order to secure the requisite action of the oxygen, according to stock, etc., and the saving in expense in reducing the amount of air blast, particularly where the air blast is heated, is very considerable.

What I claim is:

1. The process of reducing and melting metals from ores which consists in subjecting the ores to the action of nascent oxygen and hydrogen at a high temperature.

2. The process of reducing and melting metals from ores which consists in subjecting the ores to the action of nascent oxygen and hydrogen at a temperature above the dissociating point of steam.

3. The process which consists in subjecting steam to a temperature sufficient to cause dissociation and conveying the resulting dissociated product into contact with metallic ore to cause reduction and melting of the metal in the ore.

4. The process which consists in heating steam to a sufficient temperature to cause dissociation and conveying the resulting oxygen and hydrogen while still in a nascent condition into contact with the metallic ore to reduce and melt the metal of the ore.

5. The process of reducing and melting metallic ores in a chamber which consists in applying at a portion of said chamber a supply of nascent oxygen and hydrogen to reduce the ore and applying at a lower portion of the chamber a supply of nascent oxygen and hydrogen obtained from dissociated steam to melt and purify the ore.

6. The process which consists in smelting a metallic ore by the reaction thereon of carbon under the heat of an air-blast and simultaneously applying to the ore a supply of oxygen and hydrogen at a temperature above the dissociating point of steam, thereby raising the temperature of the ore above that of the normal smelting operation, and causing the sulfur and phosphorus of the ore to be removed from the metal by combination with the hydrogen.

7. The process of reducing metallic ores containing sulfur, phosphorus and other substances forming chemical combinations with the hydrogen at high temperatures; which consists in applying to such ores hydrogen and oxygen at a temperature above the dissociating point of steam.

In testimony whereof, I have hereunto set my hand at Los Angeles, California, this 11th day of August 1908.

WILLIAM H. KELLY.

In presence of—
F. M. Townsend,
A. P. Knight.